United States Patent [19]
Pedu

[11] Patent Number: 5,238,095
[45] Date of Patent: Aug. 24, 1993

[54] HYSTERESIS BRAKES AND CLUTCHES

[76] Inventor: Jeffrey C. Pedu, 6 Patch La., Lake Placid, N.Y. 12946

[21] Appl. No.: 907,704

[22] Filed: Jun. 30, 1992

[51] Int. Cl.$^5$ .............................. H02K 49/04
[52] U.S. Cl. .................. 192/84 R; 192/84 E; 188/267; 310/105
[58] Field of Search ........... 192/84 R, 84 E, 84 PM; 188/267; 464/29; 310/105, 106

[56] References Cited

U.S. PATENT DOCUMENTS

| | | | |
|---|---|---|---|
| 1,702,755 | 2/1929 | Weydell | 310/105 |
| 3,700,941 | 10/1972 | Duncan | 310/105 |
| 3,890,515 | 6/1975 | Fehr et al. | 310/105 X |
| 3,974,408 | 8/1976 | Fehr et al. | 310/105 X |

Primary Examiner—Richard M. Lorence
Attorney, Agent, or Firm—Pandiscio & Pandiscio

[57] ABSTRACT

Improved hysteresis brakes and clutches are disclosed wherein a secondary magnet is so positioned as to establish a substantially unidirectional magnetic field in the annual gap through which the disk or drag cup rotates in order to reduce or eliminate the undesirable phenomenon of "cogging".

20 Claims, 8 Drawing Sheets

HYSTERESIS BRAKES AND CLUTCHES

FIELD OF THE INVENTION

The present invention relates to improvements in hysteresis brakes and clutches and, more particularly, to an improved design that substantially eliminates the undesirable phenomenon of cogging torque.

BACKGROUND OF THE INVENTION

It is well-known in the art to provide magnetic particle brakes and clutches as shown and described in U.S. Pat. Nos. 4,575,103 and 4,681,197. In general, these devices are constructed with a gap between two armatures or poles and a shaft-mounted rotary member extending into the gap in spaced relation to the two armatures. The gap between the opposite sides of the rotary member and the adjacent armatures is filled with magnetic particles which function as the clutching medium. Under application of a magnetic field between the armatures, the normally fluid particles become a gel-like mass, thereby applying frictional forces to the rotary member and, consequently, to the shaft.

Hysteresis brakes and clutches are generally similar in construction to such magnetic particle devices, except that the magnetic particles are eliminated and magnetic forces rather than frictional forces provide the clutching medium. The rotary member of the magnetic particle devices is replaced by a shaft-mounted, magnetizable drag cup that rotates in a gap between the poles of a primary magnet which can be either a permanent magnet or an electromagnet. These devices have a number of advantages over the prior art magnetic particle brakes and clutches, in particular eliminating the problem of confining the magnetic particles inside the gap. These advantages include long life, environmental stability, precise repeatability and constancy of performance.

Since torque is produced without physical contact of parts, hysteresis devices are not subject to wear (except the normal wear of anti-friction bearings). This feature makes them distinctly superior to mechanical-friction brakes and clutches in life expectancy, servicing requirements and constancy of performance. Hysteresis brakes and clutches are also the most repeatable braking and clutching devices known. They will repeat their performance precisely, an indefinite number of times, whenever operating factors are repeated.

Hysteresis clutches and brakes are also stable in practically any environment. They are not damaged by reasonable temperature cycling, and can operate as hot as oil and bearing lubricants will tolerate. Hysteresis units have high heat-dissipation capability. When operating by fixed current they show no significant torque variation even in extreme ambience. They have operated at $-100°$ F., and the rotor member has proved stable at higher than $+1000°$ F. They also have the widest speed range of all electric torque-control devices, from zero to a high speed determined by kinetic power dissipation and the physical size of the unit. By way of example, a 1 inch diameter brake operates to speeds of over 30,000 RPM. Because they do not depend on mechanical friction, hysteresis units are absolutely and constantly smooth at any slip ratio.

Hysteresis units have high torque-to-signal linearity below saturation (except near zero). Their power consumption is extremely low. Since their working members have no physical contact and thus can accept moderate expansion without effect on operation, they can be readily adapted for use in high-vacuum applications.

Unfortunately, however, hysteresis brakes and clutches also suffer from a problem not experienced by the magnetic particle devices. Under certain conditions, hysteresis brakes and clutches experience a salient-pole phenomenon called "cogging", an undesirable, pulsating output torque that prevents smooth and efficient operation of these systems.

By way of example, consider the operation of a typical hysteresis brake. If the brake's input shaft is rotating and power is simultaneously applied to the coil, the brake will act on the shaft to slow it down in a smooth and regular fashion, without any cogging occurring. Power can also be safely reduced to the coil while the shaft is rotating without any cogging occurring. It has also been found that if the shaft stops (or substantially stops) with no change in power to the coil, no cogging will thereafter occur. However, if the power input to the coil should be reduced while the brake's input shaft is stationary, or substantially stationary, the brake will thereafter exhibit a cogging effect until it is "decogged". The phenomenon is such that the more power is reduced to the coil while the shaft is stopped, the more pronounced the cogging effect will be. Unfortunately, some manufacturing processes require stopping the shaft and reducing power to the coil, in exactly the fashion that leads to cogging. Thus, in some manufacturing processes, cogging can be a serious problem.

The "cogging" effect appears to be caused by the interaction of the poles of the primary magnet and the magnetized cup when the unit is de-energized. The residual impression of alternating north-south polarities around the circumference of the drag cup try to align with the closest corresponding pole pair of the primary magnet. The result is that the cup, and consequently the shaft, resists turning in either direction until external torque rotates the cup a sufficient angular amount to cause the poles of the cup to try to align with the next sequential pole pair of the primary magnet. This is experienced as a pulsating, cogging torque that can be as high as about one-third of the full rated torque. The existence of the "cogging" effect thus limits the utility and desirability of hysteresis brakes and clutches.

One way to eliminate "cogging" (at least in the case where the primary magnet is an electromagnet) is to first increase the input electrical power to the electromagnet to the highest value previously used and thereby reestablish the highest output torque before cogging occurred. Second, it is necessary to decrease the input electrical power to the electromagnet to zero while simultaneously turning the cup and shaft about one complete turn. This procedure has the effect of demagnetizing the cup, thereby preventing the cogging effect. However, this procedure is frequently inconvenient or impossible to perform, especially if the hysteresis device is mounted remotely from the operator, such as being located inside another piece of machinery. Furthermore, torque output during the process may be undesirable.

OBJECTS AND SUMMARY OF THE INVENTION

Accordingly, the primary object of this invention is to provide improved hysteresis brakes and clutches that substantially eliminate the phenomenon of "cogging".

Another object of this invention is to provide electromagnetic hysteresis brakes and clutches wherein cogging torque is substantially eliminated within one revolution of the cup relative to the primary magnet, whether or not electric power is applied to the coil of the electromagnet.

Still another object of this invention is to provide hysteresis brakes and clutches of either the electromagnet or permanent magnet type wherein cogging torque is substantially eliminated within one revolution of the cup relative to the primary magnet.

A further object of this invention is to provide an easy, inexpensive and efficient method for substantially eliminating the cogging effect in hysteresis brakes and clutches.

These and other objects of the present invention will be apparent from the following description. Briefly described, the improvement of this invention comprises the use of a secondary magnet, which can be either a permanent magnet or an electromagnet, that establishes a substantially unidirectional magnetic field in at least a portion of the annular gap through which the drag cup rotates. As the cup rotates and its circumference passes through the substantially unidirectional magnetic field of the secondary magnet, the alternating polarity magnetized field sections of the cup are eliminated, thereby also eliminating the cogging torque.

BRIEF DESCRIPTION OF THE DRAWINGS

Still other objects and features of the present invention will be apparent from the following description, which is to be read together with the accompanying drawings wherein.

In the drawings, in general where clarity permits the same numbers are used to identify like parts even though their location or nature may change somewhat in the different embodiments described.

DETAILED DESCRIPTION OF THE INVENTION

Figures 1, 1A, 1B:
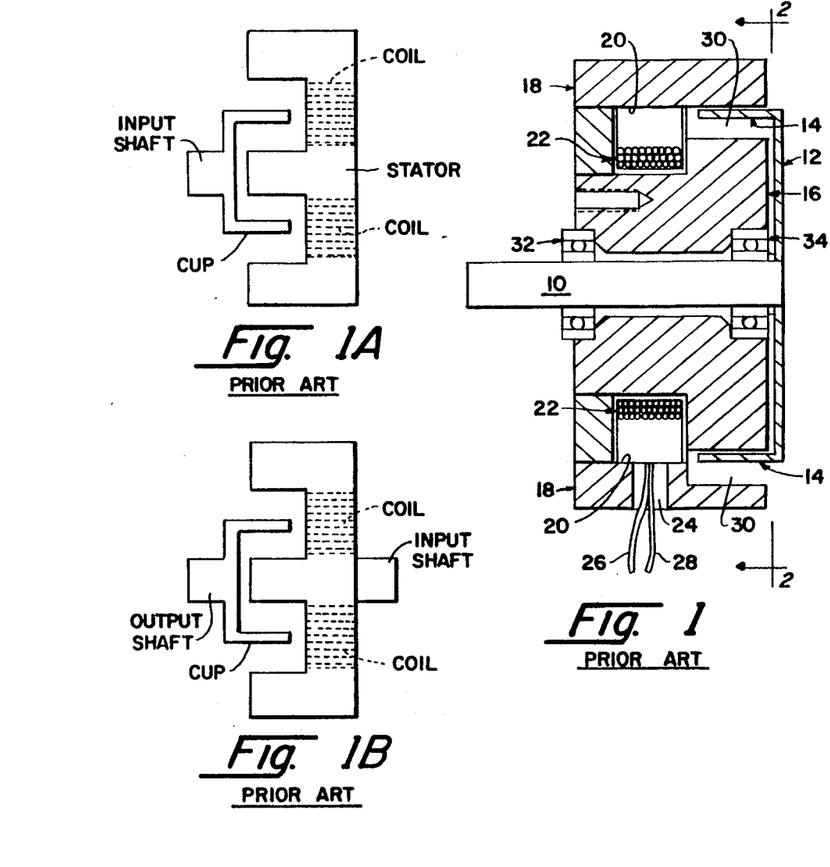
FIG. 1 is a longitudinal sectional view of a conventional hysteresis brake or clutch using an electromagnet as the primary magnet.
FIG. 1A is a simplified cross-section of a hysteresis brake.
FIG. 1B is a simplified cross-section of a hysteresis clutch.

Referring now to FIG. 1, the illustrated apparatus comprises a rotatable shaft 10 coupled to a disk 12 projecting radially at about a 90° angle from the shaft and an annular flange or lip 14 at the periphery of disk 12 which functions as a drag cup. Flange 14 comprises a magnetic material. Preferably flange 14 comprises a magnetically semi-hard material such as a ferrous alloy. Disk 12 may or may not comprise a similar material. Flange 14 may be formed as an integral part of disk 12, or it may be separately formed and then secured to the disk by any suitable means, e.g. by brazing or welding. Shaft 10 is adapted to be connected in ways well known in the art to a second shaft (not shown) which typically functions as an output shaft in the case of a clutch or as the input shaft in the case of a brake.

The apparatus further comprises an electromagnet energizing assembly in the form of two ring-like magnet members 16 and 18 disposed in a concentric cylindrical configuration with respect to each other and with respect to shaft 10. Magnet members 16 and 18 are shaped so as to define between them an annular groove 20 of rectangular or square cross-section in which is disposed a coil assembly 22. Member 18 has a radial opening in which is received an insulating plug 24 that secures the two leads 26 and 28 of coil 22. The two leads are brought out of the magnet assembly as shown for connection to an exterior energizing power supply (not shown). The inner circumference of member 16 is shaped or machined so as to accept bearings 32 and 34 to rotatably support shaft 10 in relation to the electromagnet energizing assembly.

Magnet members 16 and 18 are also shaped and disposed so as to define between them an annular gap 30 to receive the flange 14 of the drag cup. Flange 14 is sized and spaced radially from members 16 and 18 so as to permit the unimpeded rotation of shaft 10 and the attached drag cup in the absence of magnetic forces. When the coil and pole structure shown in FIG. 1 is activated by energizing the electromagnet, however, a primary stationary magnetic field is established in annular gap 30. The primary magnetic field causes the drag cup to become magnetized, and the magnetic field of the cup interacts with the primary field to produce a retarding torque based on what is, in effect, magnetic friction between the components. The foregoing structure can be arranged and adapted so as to permit it to function as a brake, in which case the magnet assembly is fixed against rotation relative to the cup and shaft (FIG. 1A), or as a clutch, in which case the magnet assembly is allowed to rotate relative to the cup and shaft (FIG. 1B).

FIG. 1A is a simplified cross-sectional view of a hysteresis brake assembly. In such a brake application, the pole structure is a stator in the gap of which the drive-actuated permanent-magnet cup rotates. When magnetic friction is applied between the two components, an even drag is produced. Depending upon its degree, which is fully controllable, the drag stops the input or allows it to rotate under predictable load.

FIG. 1B shows a simplified cross-sectional view of a hysteresis clutch assembly. In such a clutch application, both members rotate on concentric shafts; the pole structure is keyed to input, the permanent-magnet cup to output. Output torque is controlled by the degree of magnetism imposed on the pole structure. Slippage is infinitely variable and controllable from fully disengaged to fully engaged (zero slippage).

Figure 2:
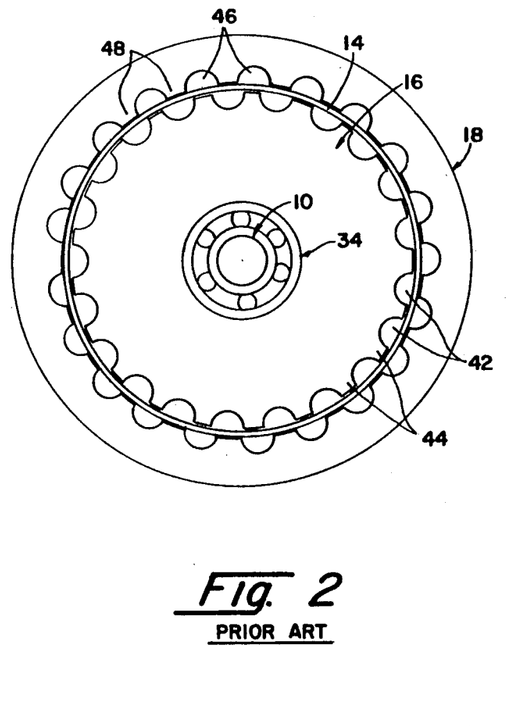
FIG. 2 is a cross-sectional view taken along the line 2—2 of the hysteresis device of FIG. 1.

FIG. 2, a cross-sectional view taken along the line 2—2 of FIG. 1, more clearly illustrates the configuration of magnet members 16 and 18 and their disposition with respect to each other. The outer circumference of member 16 comprises a reticulated pole structure defined by a plurality of equal-sized, evenly-spaced semicircular slots 42 such that the spacing between adjacent slots equals the diameters of the slots, thereby defining a plurality of equal-sized, evenly-spaced poles 44. The inner circumference of member 18 correspondingly comprises a reticulated pole structure defined by a plurality of equal-sized, evenly-spaced semicircular slots 46 such that the spacing between adjacent slots equals the diameters of the slots, thereby defining a plurality of equal-sized, evenly-spaced poles 48 having substantially the same size and spacing as poles 44. Each pole 44 of member 16 is permanently aligned opposite a corresponding slot 46 of member 18. Similarly, each pole 48 of member 18 is permanently aligned opposite a corresponding slot 42 of member 16. When power is supplied to coil assembly 22, each pole 44 of member 16 will be matched with a pole 48 of member 18 of equal but opposite polarity.

Figure 3:
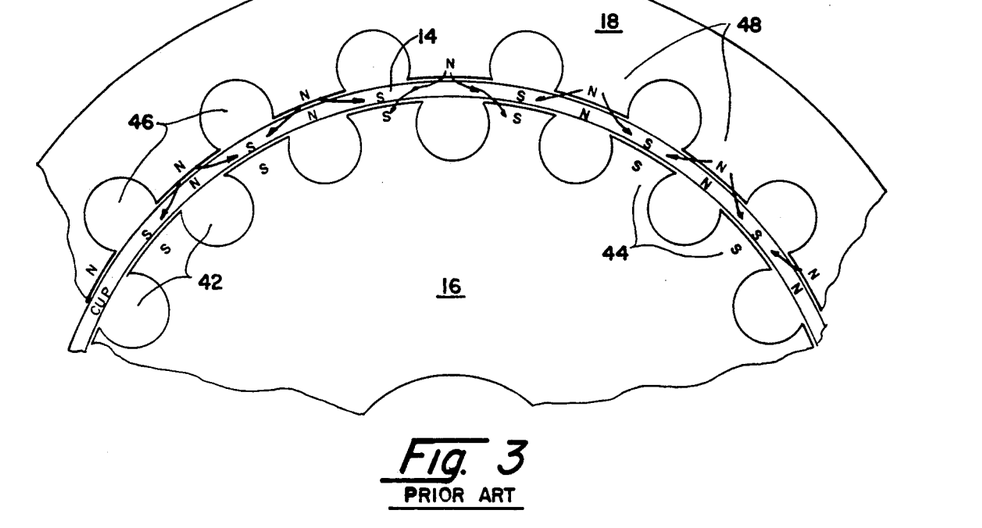
FIG. 3 is an enlarged fragmentary view of a portion of FIG. 2 showing how the poles of the primary magnet induce residual impressions of alternating north-south polarities around the circumference of the drag cup.

FIG. 3 is an enlarged fragmentary view of a portion of FIG. 2 that shows more clearly how the pole pairs 44 and 48 induce residual impressions of alternating north-south polarities around the circumference of flange 14 of the drag cup. As shown in FIG. 3, the poles 44 of member 16 assume a south polarity and the poles 48 of member 18 assume a north polarity when the coil assembly is energized. It should be apparent that the results, as described below, would be similar if the polarities were reversed. Poles 44 and 48 induce corresponding polarities in adjacent sections of flange 14 of the drag cup extending sequentially around the circumference of flange 14 in a regularly spaced alternating polarity pattern. The position of the magnetized sections of the cup move circumferentially in relation to the cup as the cup rotates. The primary magnetic field and the magnetized cup interact to produce the desired retarding torque.

The undesirable characteristic called "cogging" occurs in the conventional hysteresis brakes and clutches described above when the magnetized drag cup tries to remain in a number of regularly spaced fixed positions equal to the number of pole pairs 44 and 48 (FIG. 3) as each of the north-south magnetized sections of the cup tries to align with the closest pole pair 44 and 48. When this occurs, the cup, and consequently output shaft 10 (FIG. 1), resists turning in either direction. If an external torque is applied to rotate the cup and shaft an angular amount approximately equal to 360 degrees divided by twice the number of pole pairs, the north-south magnetized sections impressed around the circumference of flange 14 will become attracted to the next adjacent pole pair 44 and 48.

"Cogging" as described above occurs only when the drag cup becomes magnetized and the applied field from the pole pairs 44 and 48 is relatively low or zero. The pole pairs impress a north-south, south-north alternating polarity magnetic field on the cup. When the strength of the alternating polarity field is decreased over an angular movement of about one revolution or more, the decreasing strength, alternating polarity magnetic field demagnetizes the cup, and there is no cogging. However, when the strength of the magnetic field is decreased over a low or zero angular movement of the cup, the cup does not become demagnetized because the material of the cup does not go through a sufficient number of decreasing amplitude cycles of the B-H curve. As a result, the interaction of the magnetized cup with the poles of the primary magnet can cause cogging to occur.

Figure 4:
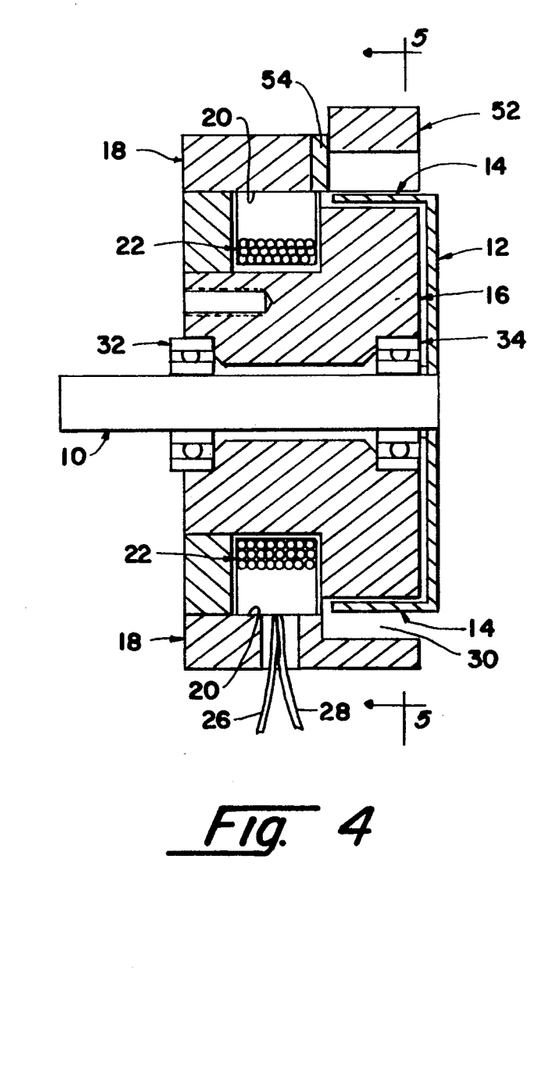
FIG. 4 is a longitudinal sectional view taken along line 4—4 of FIG. 5 of one embodiment of a hysteresis device using an electromagnet as the primary magnet and also incorporating a secondary magnet in accordance with the present invention, wherein the secondary magnet is positioned along the outer circumference of the primary magnet.

A first embodiment of the present invention will now be described by reference to FIG. 4. FIG. 4 is a longitudinal sectional view of a hysteresis device similar to that shown in FIG. 1, except for modifications to incorporate therein a secondary magnet 52 positioned along the outer circumference of the primary magnet in accordance with one embodiment of the invention.

As is the case with the device shown in FIG. 1, in the device shown in FIG. 4 rotatable shaft 10 is coupled to disk 12 having an annular flange 14 that extends into the annular gap 30 between magnet members 16 and 18. An aperture or slot 50 in member 18 (FIG. 5) is designed to accommodate the permanent secondary magnet 52 in proximity to a portion of flange 14. Shield member 54 (FIGS. 4 and 5) is made of a non-magnetic material and separates secondary magnet 52 from the surrounding portions of member 18 in order to minimize the impact of the primary magnet on the secondary magnet.

Figure 5:
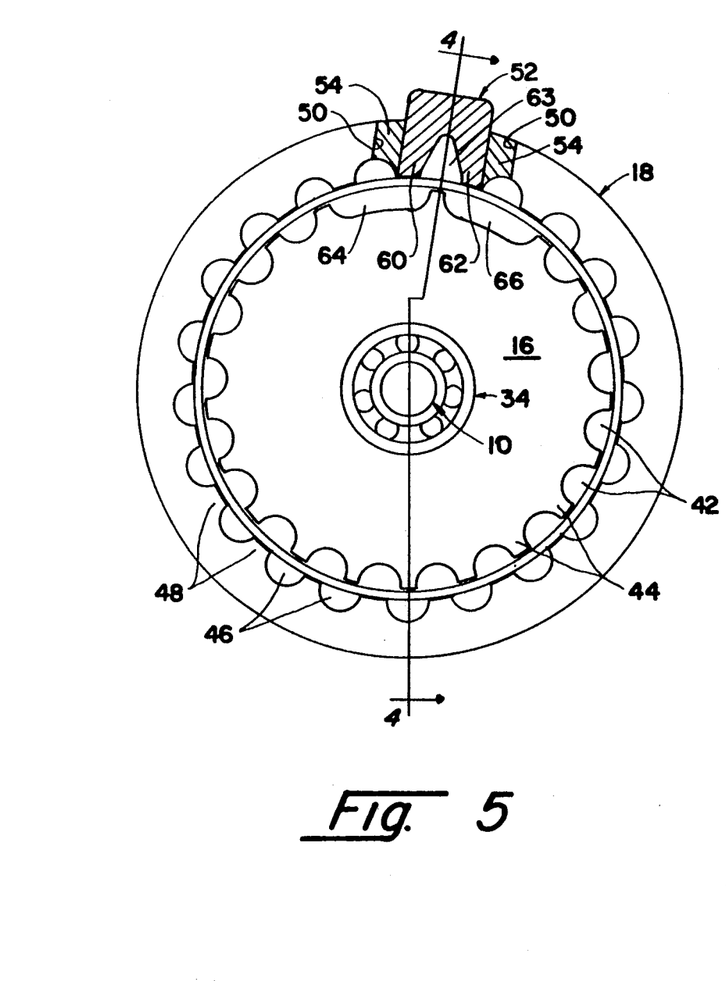
FIG. 5 is a cross-sectional view taken along the line 5—5 of the hysteresis device of FIG. 4.
Figure 6:
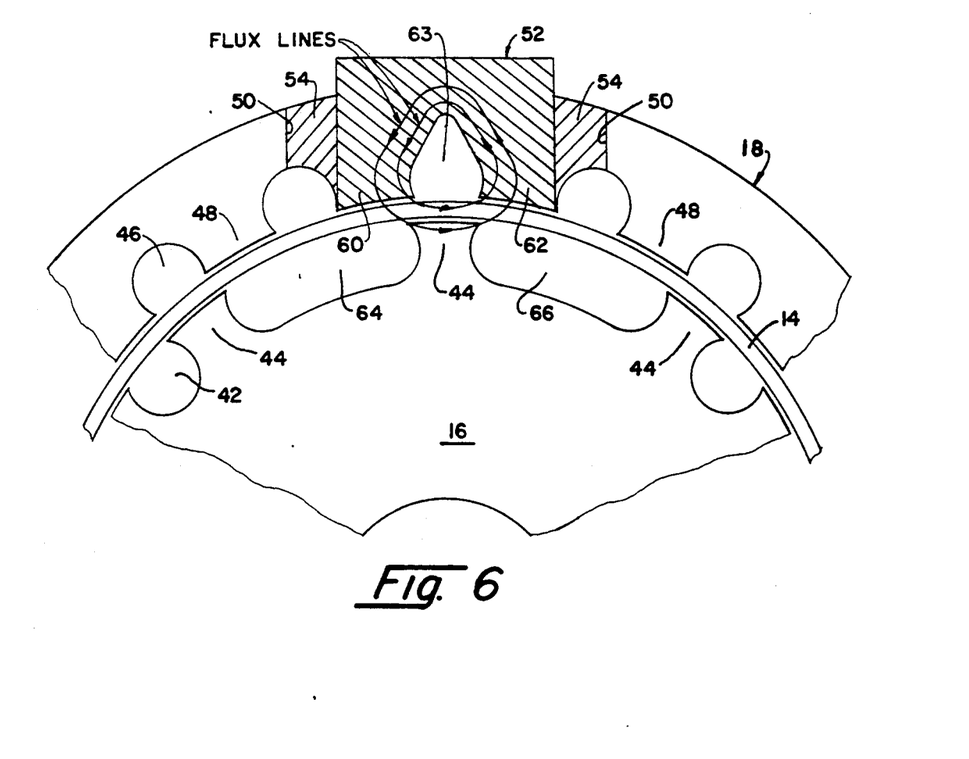
FIG. 6 is an enlarged fragmentary view of a portion of FIG. 5 showing how the flux lines of the secondary magnet establish a unidirectional magnetic field in a portion of the annular gap through which the drag cup rotates.

FIG. 5, a cross-sectional view taken along the line 5—5 of FIG. 4, more clearly illustrates the disposition of secondary magnet 52 with respect to the magnet members 16 and 18 and flange 14 of the drag cup. In the preferred embodiment, magnet 52 is of such size and is so positioned that the two poles 60 and 62 of magnet 52 are aligned with two of the gaps located between poles 44 of member 16, and one pole 44 of member 16 is aligned with the gap 63 between the poles 60 and 62 of magnet 52 As shown in FIGS. 5 and 6, member 16 preferably has its outer circumference formed so that two elongated longitudinal slots 64 and 66 sit opposite the two poles 60 and 62 of magnet 52. Slots 64 and 66 are larger than the semicircular slots 42 located about the remainder of the periphery of member 16, and are preferably formed by deleting the portion of member 16 that otherwise would separate two adjacent semicircular slots 42. Such a construction permits magnet poles 60 and 62 to reside respectively adjacent to the longitudinal slots 64 and 66, while at the same time permitting a pole member 44 of member 16 to reside adjacent to the gap 63 formed between the two poles 60 and 62 of magnet 52. It has been found that using elongated longitudinal slots 64 and 66 reduces the leakage of magnetic flux from magnet 52.

FIG. 6 is an enlarged fragmentary view of the portion of FIG. 5 that includes secondary magnet 52 and longitudinal slots 64 and 66. FIG. 6 illustrates how secondary magnet 52 establishes a substantially unidirectional magnetic field in the portion of annular gap 30 (FIG. 4) that is adjacent to magnet 52. As shown in FIG. 6, the magnetic field from magnet 52 passes essentially tangentially through flange 14 of the cup, into the inner pole 44, then essentially tangentially through flange 14 of the cup, and back to magnet 52. Note that the magnetic flux is substantially unidirectional through flange 14 of the cup. This eliminates the magnetic field pattern in the cup that otherwise causes cogging under certain operating conditions.

The two longitudinal slots 64 and 66 in the inner pole piece 16 eliminate the primary magnetic flux leakage path, thereby permitting a smaller magnet to be used. The longitudinal slots also decrease the residual (coil de-energized) drag caused by magnet 52.

To eliminate cogging using the improved hysteresis device shown in FIGS. 4, 5 and 6, the shaft 10 and attached drag cup must turn one complete revolution, with or without the primary magnet energized. The cup must turn one revolution to expose all of the alternating polarity magnetized sections to the essentially unidirectional field of magnet 52 to eliminate the cogging. The strength of the cogging torque is proportional to the number of sections that are still magnetized from the primary pole structure, and also the strength of the magnetic field from each section of the cup.

Figure 6A:
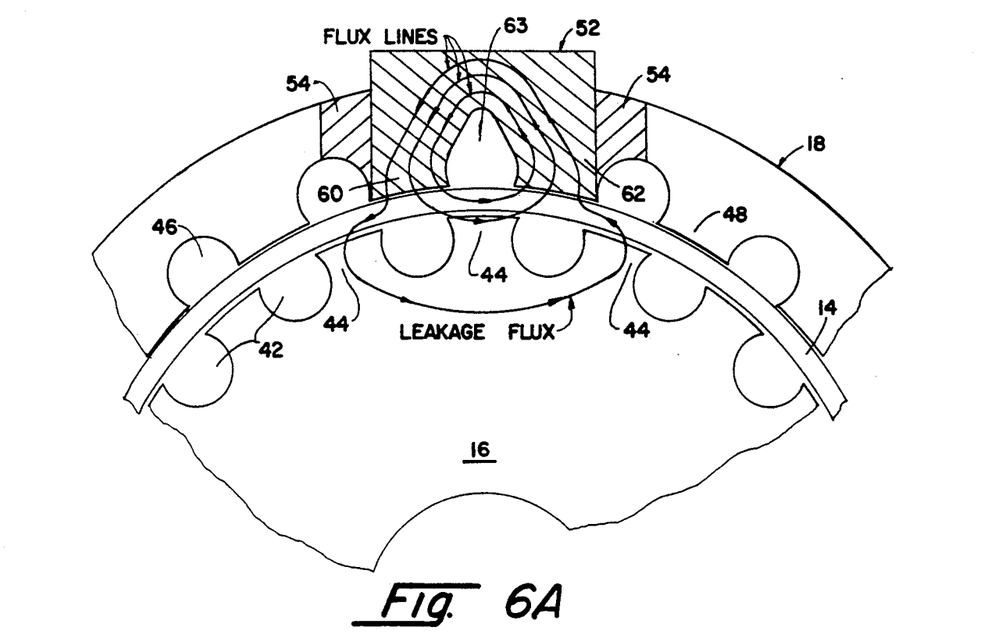
FIG. 6A is a view like that of FIG. 6, except that it shows a modified form of the device shown in FIG. 6.

Looking next at FIG. 6A, it is also contemplated that member 16 could have a uniform construction about its entire periphery, and thus not utilize the enlarged slots 64 and 66 shown in FIGS. 5 and 6. With such a construction, magnet poles 60 and 62 would each sit opposite a semicircular slot 42, and a pole 44 from member 16 would sit opposite the gap 63 formed by the two poles 60 and 62 of magnet 52. While such a construction is believed to work acceptably well, it is believed to be somewhat less desirable than the embodiment shown in FIGS. 5 and 6, since it may require the use of a larger magnet 52 due to the existence of the magnetic flux leakage path which extends through the two poles 44 of member 16 which are disposed just outboard of the two poles 60 and 62 of magnet 52. See FIG. 6A. In addition to the foregoing, it is also believed that the construction shown in FIG. 6A may be somewhat less desirable than the construction shown in FIGS. 5 and 6, since the magnetic flux leakage path which extends through the two poles 60 and 62 of magnet 52 (see FIG. 6A) will tend to place an alternating magnetized pattern on the cup flange 14 in the region of magnet 52, which alternating magnetized pattern would generate a small amount of braking torque just like the primary field and coil do.

Figure 6B:
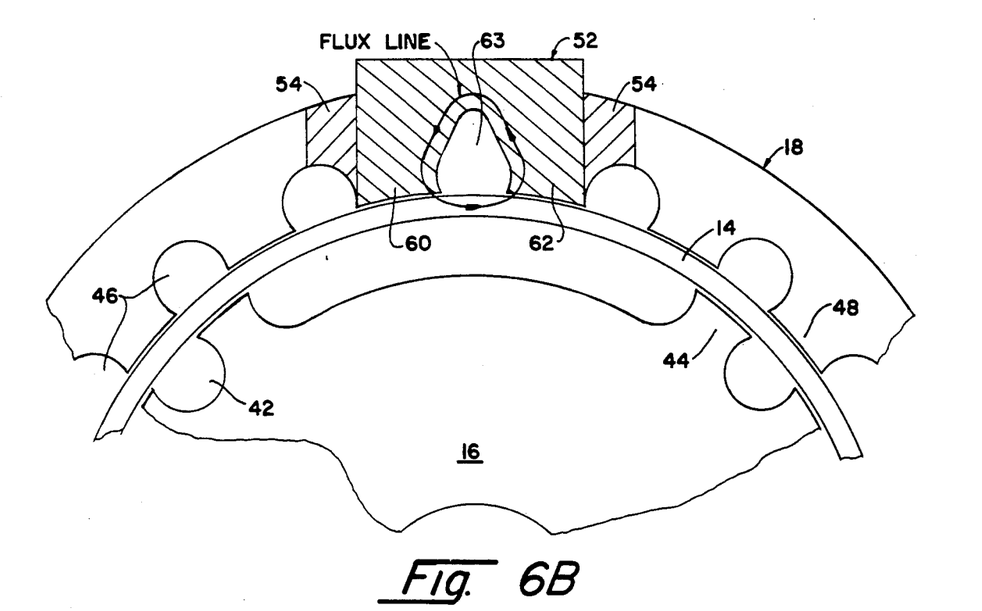
FIG. 6B is also a view like that of FIG. 6, except that it shows another modified form of the device shown in FIG. 6.

Looking next at FIG. 6B, it is also contemplated that one might modify the apparatus shown in FIG. 6 by deleting the pole 44 of magnet member 16 that separates the two slots 64 and 66 from one another, so that one large elongated slot is formed in magnet member 16 opposite to magnet 52. In other words, one might modify the apparatus of FIG. 6 by deleting the pole 44 of member 16 which was disposed opposite to the slot 63 formed between the two poles 60 and 62 of magnet 52, so that the portion of magnet member 16 which is disposed opposite to magnet 52 is recessed along the entire length of magnet 52.

Figure 6C:
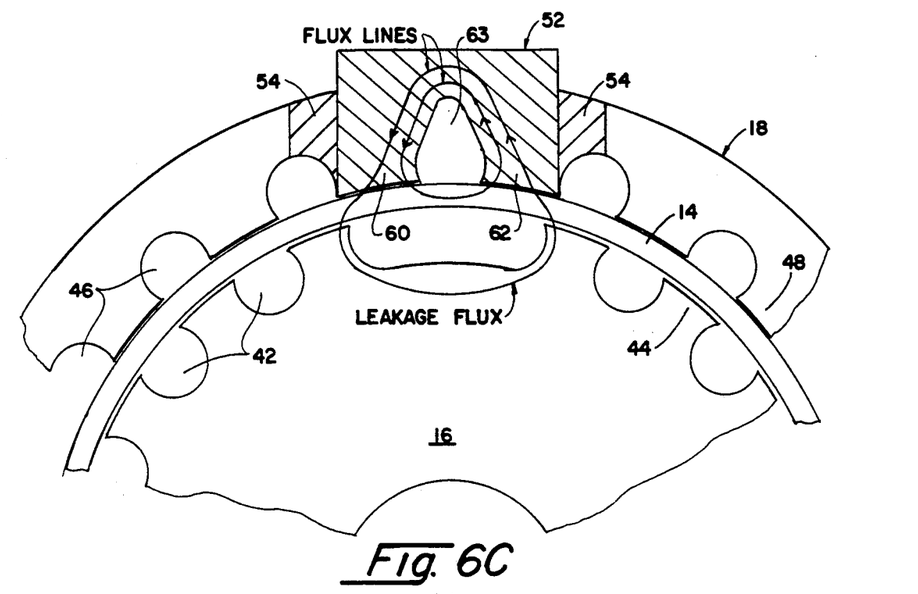
FIG. 6C is also a view like that of FIG. 6, except that it shows still another modified form of the device shown in FIG. 6.

Looking next at FIG. 6C, it is also contemplated that one might modify the apparatus shown in FIG. 6A by deleting the pole 44 of magnet member 16 that is disposed opposite the gap 63 formed between the poles 60 and 62 of magnet 52. While such a construction is believed to work acceptably well, it is believed to be somewhat less desirable than the embodiment shown in FIGS. 5 and 6, since it may require the use of a larger magnet 52 due to the existence of the magnetic flux leakage path which extends through the two poles 44 of member 16 which are disposed just outboard of the two poles 60 and 62 of magnet 52. Also, the construction shown in FIG. 6C may be somewhat less desirable than the construction shown in FIGS. 5 and 6, since the magnetic flux leakage path which extends through the two poles 60 and 62 of magnet 52 (see FIG. 6C) will tend to place an alternating magnetized pattern on cup flange 14 in the region of magnet 52, and this alternating magnetized pattern will tend to generate a small amount of braking torque just like the primary field and coil do.

Figure 7:
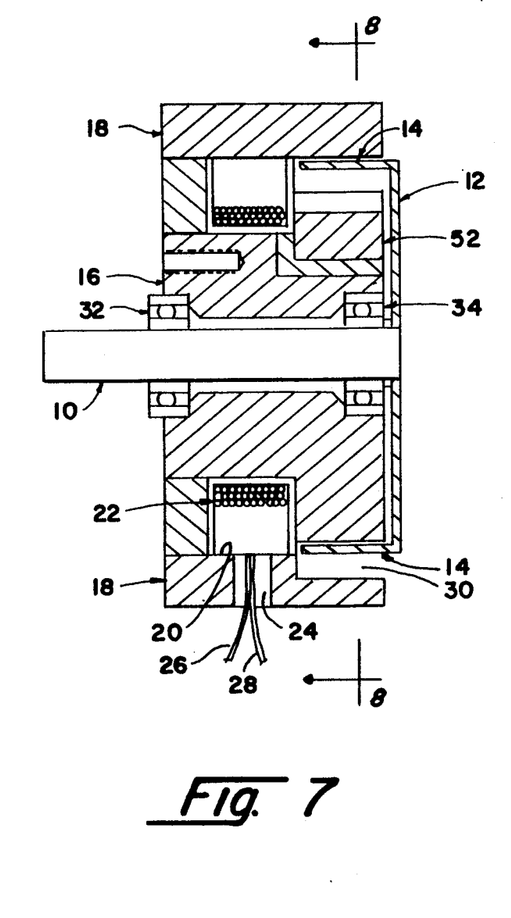
FIG. 7 is a longitudinal sectional view of another embodiment of a hysteresis device incorporating a secondary magnet in accordance with the present invention, wherein the secondary magnet is positioned along the inner circumference of the primary magnet.
Figure 8:
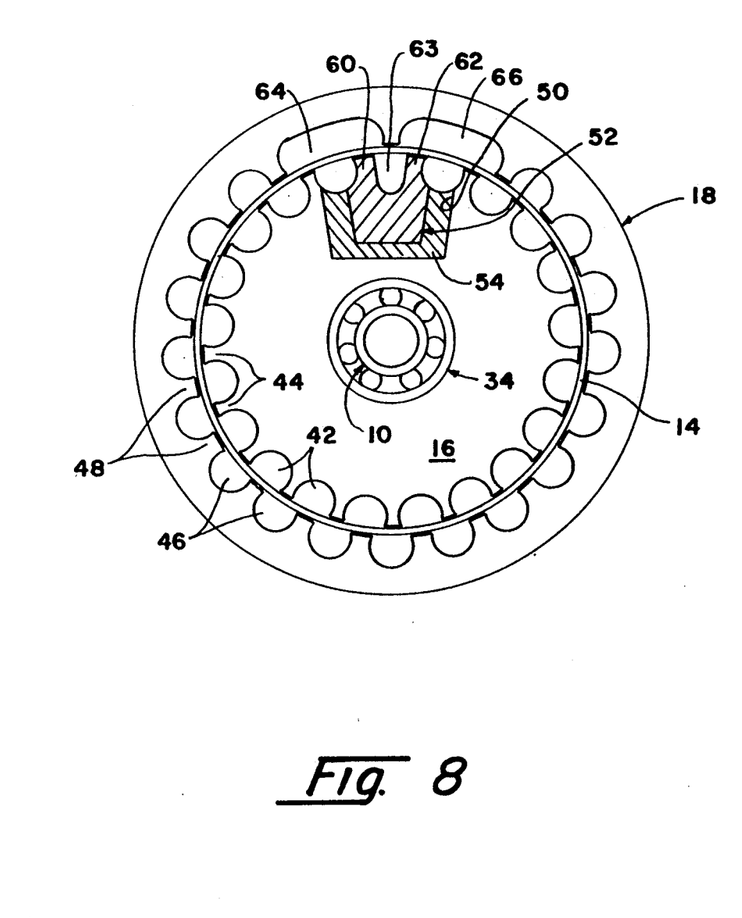
FIG. 8 is a cross-sectional view taken along the line 8—8 of the hysteresis device of FIG. 7.

Another embodiment of the improved hysteresis device of the present invention is shown in FIGS. 7 and 8. FIG. 7 is a longitudinal sectional view of a hysteresis device formed in accordance with the present invention, wherein the secondary magnet 52 is positioned in an aperture 50 (FIG. 8) which is formed in member 16 so as to hold magnet 52 in proximity to a portion of flange 14. Shield member 54, which is made of a nonmagnetic material, separates secondary magnet 52 from the surrounding portions of member 16.

FIG. 8, which is a cross-sectional view taken along the line 8—8 of FIG. 7, more clearly illustrates the disposition of secondary magnet 52 with respect to the magnet members 16 and 18, and with respect to the flange 14 of the drag cup. In the preferred embodiment, magnet 52 is sized and positioned so that its two poles 60 and 62 are substantially respectively opposite to two adjacent slots formed along the inner circumference of member 18, and so that the gap 63 formed between the two poles of magnet 52 is substantially opposite to a pole 48 of magnet member 18. Preferably the two slots formed in magnet member 18 opposite the two poles 60 and 62 of magnet 52 are elongated so as to form two longitudinal slots 64 and 66, each formed by deleting the portion of the member 18 that otherwise would separate two adjacent semicircular slots 46.

Thus, it will be seen that the construction illustrated in FIG. 8 is generally analogous to the construction illustrated in FIG. 6, except that in FIG. 8 magnet 52 is positioned in magnet member 16 and faces towards flange 14 and magnet member 18, whereas in FIG. 6 magnet member 52 is positioned in magnet member 18 and faces towards flange 14 and magnet member 16.

It is also contemplated that the embodiment illustrated in FIG. 8 might be modified somewhat, in the sense that the slots formed in magnet member 18 opposite to the poles 60 and 62 of magnet 52 might be sized the same size as all of the other slots 46 formed in magnet member 18 (in a construction generally analagous to the construction illustrated in FIG. 6A); or that the one pole member 48 of member 18 that separates longitudinal slots 64 and 66 could be deleted so as to form a single longitudinal slot along the inner circumference of member 18 opposite to magnet 52 (in a construction generally analogous to the construction illustrated in FIG. 6B); or that the slots formed in magnet member 18 opposite to the poles 60 and 62 of magnet 52 might be sized the same size as all of the other slots 46 formed in magnet member 18, and the one pole member 48 of member 18 separating these slots could be deleted (in a construction generally analogous to the construction illustrated in FIG. 6C).

Figure 9:
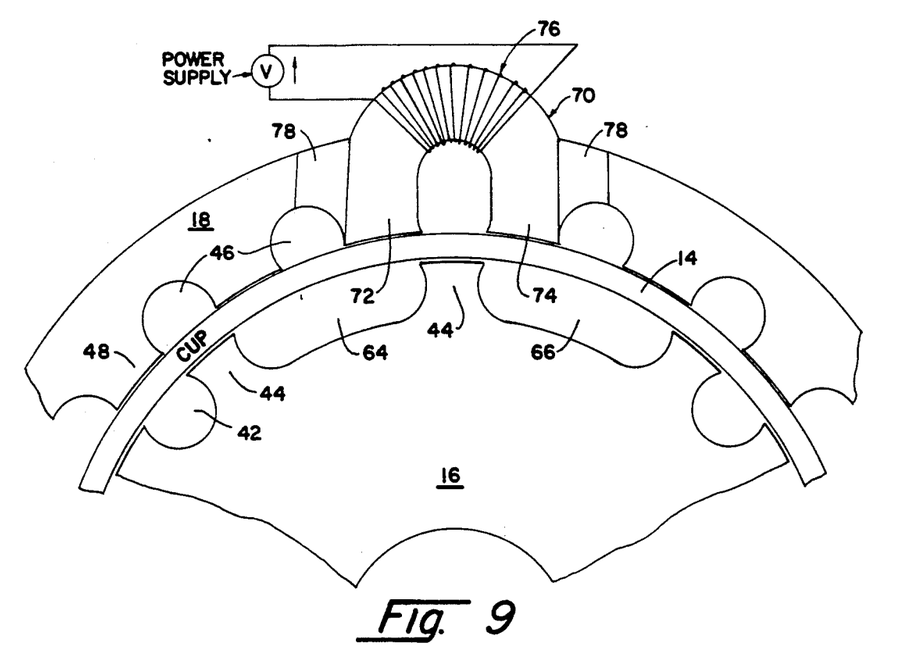
FIG. 9 is an enlarged fragmentary view, similar to that of FIG. 6, of a portion of a hysteresis device formed in accordance with the present invention wherein the secondary magnet is an electromagnet with coils and an external power source.

FIG. 9 is an enlarged fragmentary view, similar to that of FIG. 6, of a portion of another hysteresis device formed in accordance with the present invention. The device of FIG. 9 differs from the device of FIG. 6, however, in that the permanent secondary magnet 52 of FIG. 6 is replaced with a secondary electromagnet 70 comprising poles 72 and 74 and an electrical coil 76 connected to an external power source. Shield member 78, formed out of a non-magnetic material, separates secondary magnet 70 from the surrounding portions of member 18 in order to minimize the impact of the primary magnet on the secondary magnet. When direct current power is applied to coil 76 to activate electromagnet 70, cogging can be eliminated in the same manner as described above in connection with FIGS. 4-8. When alternating current power is applied to coil 76 to activate electromagnet 70, the results are similar except that the de-energized drag of the brake is reduced somewhat.

It will be appreciated that the construction illustrated in FIG. 9 is generally analogous to the construction illustrated in FIG. 6, except that the permanent magnet 52 of FIG. 6 has been replaced by the electromagnet 70 of FIG. 9. It will be noted that in FIG. 9, magnet member 16 is formed with the two longitudinal slots 64 and 66 opposite to magnet poles 72 and 74, respectively. Of course, it is also contemplated that the construction of magnet member 16 might be modified from that shown in FIG. 9 if desired, e.g. in ways analagous to those shown in FIGS. 6A, 6B or 6C. It should be appreciated that while in the foregoing description of the devices of FIGS. 1-9 slots 42 and 46 have been shown and described as having a semicircular configuration, alternative configurations (e.g. rectangular) might also be used for the slots.

Figures 10, 11:
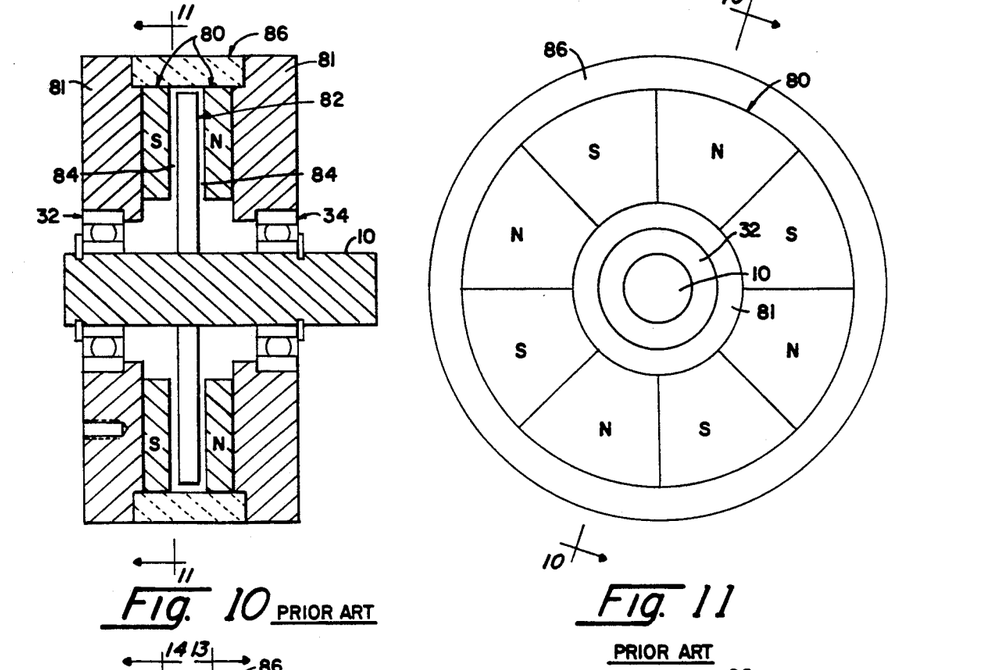
FIG. 10 is a longitudinal sectional view taken along the line 10—10 of FIG. 11 of a conventional hysteresis brake or clutch formed using a permanent magnet as the primary magnet.
FIG. 11 is a cross-sectional view taken along the line 11—11 of the hysteresis device of FIG. 10.

FIG. 10 is a longitudinal sectional view of a conventional hysteresis device more or less similar to the conventional hysteresis device disclosed in FIG. 1, except that a pair of permanent magnets 80 are used as the device's primary magnet, instead of the electromagnet shown in FIG. 1. Each permanent magnet 80 is mounted to a housing half 81. In this configuration, instead of having a drag cup as shown in FIG. 1, a disk 82 (comprising a magnetic material, and preferably comprising a magnetically semi-hard material) is coupled to shaft 10 and projects radially outward therefrom at about a 90° angle from the shaft. Disk 82 is disposed so as to rotate in the annular gap 84 located between the north-south poles of the primary permanent magnets 80 when shaft 10 rotates on bearings 32 and 34. Annular shield member 86, formed out of a non-magnetic material, surrounds the outer periphery of magnets 80. The primary magnetic field of magnets 80 causes disk 82 to become magnetized, and the magnetic field of the disk interacts with the primary field to produce a retarding torque.

FIG. 11, a cross-sectional view taken along line 11—11 of FIG. 10, more clearly illustrates the configuration of permanent primary magnets 80 and their disposition with respect to shaft 10. FIG. 11 illustrates how the torque-producing magnetic field is produced by the two "washer"-shaped magnets 80 which are permanently magnetized in radial segments of alternating polarity. Torque is varied by varying the angular position of one magnet 80 in relation to the other magnet 80. Means well known in the art (not shown) are typically provided for accomplishing such angular positioning of the two "washer"-shaped magnets 80 relative to one another, generally by permitting the two housing halfs 81 to coaxially rotate relative to one another. For maximum torque, opposite polarity poles should be positioned directly opposite each other. For minimum torque, like polarity poles should be positioned directly opposite each other.

Permanent magnet hysteresis devices of the type shown in FIGS. 10 and 11 experience an undesirable cogging effect in the same manner as do the electromagnet hysteresis devices shown in FIGS. 1-3. Cogging occurs in the devices of FIGS. 10 and 11 when the output torque is decreased during a small or zero angular movement of disk 82 and shaft 10. Maximum cogging torque occurs when the torque is decreased from maximum to zero while disk 82 and shaft 10 are held stationary.

The aforementioned cogging problem of permanent primary magnet hysteresis devices such as those shown in FIGS. 10 and 11 can also be substantially eliminated by using a secondary magnet of either the permanent or electromagnet variety.

Figure 12:
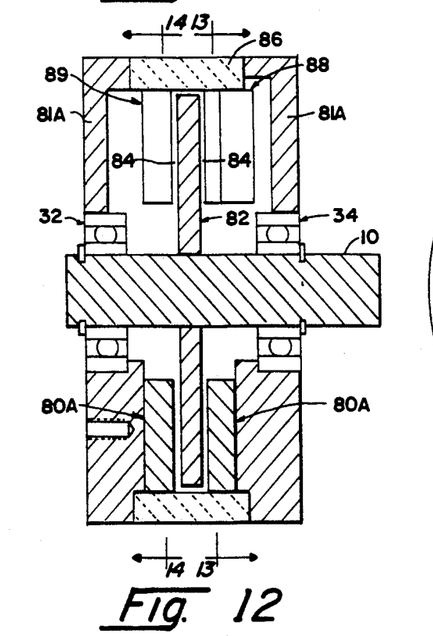
FIG. 12 is a longitudinal sectional view of one embodiment of a hysteresis device using a permanent magnet as the primary magnet and also incorporating a secondary magnet in accordance with the present invention.
Figure 13:
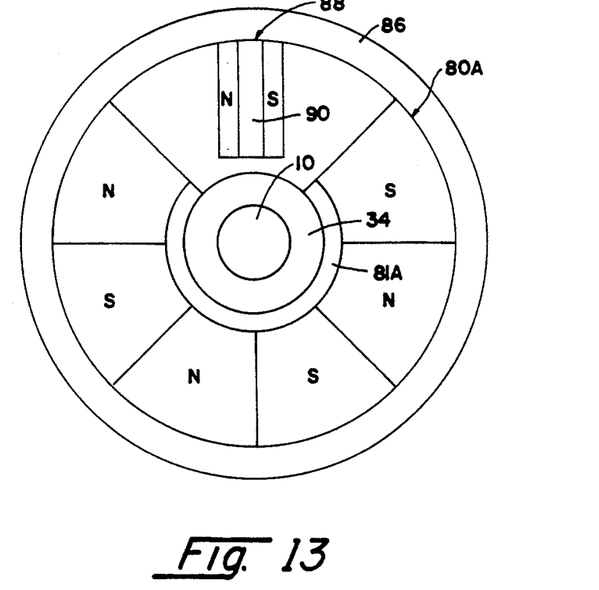
FIG. 13 is a cross-sectional view taken along the line 13—13 of the hysteresis device of FIG. 12.
Figure 14:
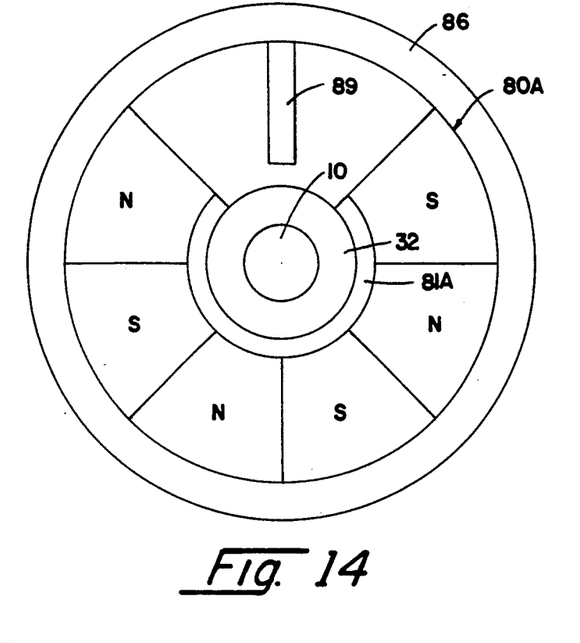
FIG. 14 is a cross-sectional view taken along the line 14—14 of FIG. 12.

More particularly, one such improved hysteresis device is shown in FIGS. 12-14. FIG. 12 is a longitudinal sectional view of a hysteresis device similar to that shown in FIG. 10, except for modifications to the permanent primary magnets 80A to omit several pole sections of the magnets, and except for modifications to incorporate a secondary magnet 88 in place of the "missing" pole sections of one of the two permanent primary magnets 80A, and except for modifications to incorporate a pole 89 in place of the "missing" pole sections of the other of the two primary magnets 80A. Pole 89 is formed out of a piece of magnetic steel; it is not itself a magnet. As in FIG. 10, in FIG. 12 rotatable shaft 10 is coupled to disk 82 which rotates in annular gap 84 between the two primary magnets 80A. Shield member 86 of a non-magnetic material surrounds the outer periphery of magnets 80. Each permanent magnet 80A is mounted to a housing half 81A. Secondary magnet 88 and pole 89 are mounted to shield member 86.

FIG. 13, a cross-sectional view taken along line 13—13 of FIG. 12, more clearly illustrates the disposition of secondary magnet 88 with respect to its associated primary magnet 80A. In the preferred embodiment, secondary magnet 88 is a U-shaped permanent magnet disposed such that its north and south poles lie in the plane of the disk-facing side of its associated primary magnet 80A. A gap 90 is positioned between the two poles of secondary magnet 88.

FIG. 14, a cross-sectional view taken along line 14—14 of FIG. 12, more clearly illustrates the disposition of pole 89 with respect to its associated primary magnet 80A. Pole 89 is positioned such that it is aligned with gap 90 in secondary magnet 88. It will be appreciated that inasmuch as both secondary magnet 88 and pole 89 are mounted to shield member 86, secondary magnet 88 and pole 89 will remain in fixed relationship to one another regardless of the movement of permanent magnets 80A relative to one another. At the same time, inasmuch as primary magnets 80A are both preferably formed so as to omit one North pole and one South pole, and inasmuch as secondary magnet 88 is centered in place of the "missing" pole sections of one of the two primary magnets 80A (see FIG. 13) and pole 89 is centered in place of the "missing" pole sections of the other of the two primary magnets 80A (see FIG. 14), magnets 80A can move relative to one another (and relative to secondary magnet 88 and pole 89) so as to produce the desired torque. In particular, it should be noted that secondary magnet 88 and pole 89 are formed so as to be no wider than the width of one pole of a primary magnet 80A at its narrowest point (i.e., at its inner diameter), so that each of the primary magnets 89A can be rotated a "half pole" in either direction relative to secondary magnet 88 and pole 89. Such a construction will ensure that the hysteresis device will have fully adjustable torque, without the secondary magnet 88 touching its adjacent primary magnet 80A (and without pole 89 touching its adjacent primary magnet 80A).

To eliminate cogging using the improved hysteresis device shown in FIGS. 12-14, the shaft 10 and attached disk 82 must turn one complete revolution. The disk must turn one revolution to expose all of the alternating polarity magnetized sections on disk 82 to the essentially unidirectional field of secondary magnet 88 to eliminate the undesired cogging. The strength of the cogging torque is proportional to the number of sections on disk 82 that are still magnetized from the primary pole structure, and also to the strength of the magnetic field from each section of the disk. The relative position of the torque producing magnets 80A has no effect on de-cogging.

Figure 15:
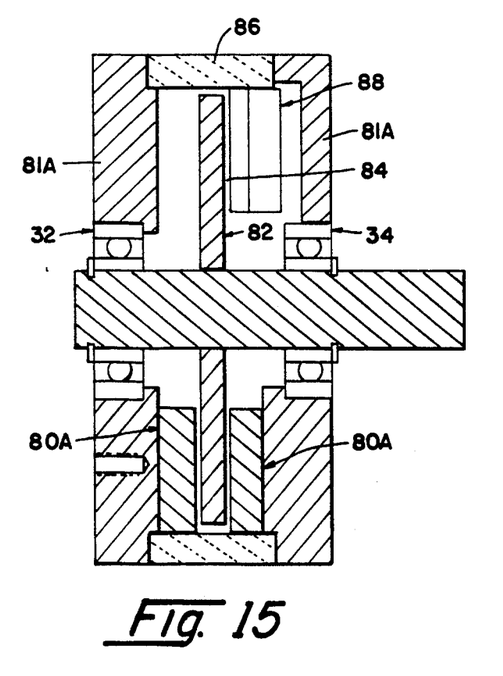
FIG. 15 is a view like that of FIG. 12, except that it shows a modified form of the device shown in FIG. 12.

Looking next at FIG. 15, there is shown yet another hysteresis device. This device is identical to the device shown in FIGS. 12-14, except that the pole 89 is omitted completely from the device.

Since certain changes may be made in the above-described processes and products without departing from the scope of the invention herein involved, it is intended that all matter contained in the above description shall be interpreted in an illustrative and not in a limiting sense.

What is claimed is:

1. A hysteresis brake or clutch apparatus comprising in combination:
    a rotatable shaft;
    a disk coupled to said shaft and projecting radially therefrom, said disk comprising a first portion comprising a magnetic material;
    a primary magnet comprising a plurality of north-south poles and defining an annular region between said poles, said primary magnet being disposed about said shaft so that said first portion of said disk rotates past said poles and through the magnetic field of said primary magnet when said shaft rotates; and
    a secondary magnet disposed about said shaft so that said first portion of said disk rotates past said secondary magnet and through the magnetic field of said secondary magnet when said shaft rotates.

2. Apparatus according to claim 1 wherein said secondary magnet is so disposed as to establish a substantially unidirectional magnetic field in said annular region.

3. Apparatus according to claim 2 wherein said primary magnet is an electromagnet.

4. Apparatus according to claim 3, wherein said disk comprises a disk portion and a flange portion, and further wherein said first portion is located on said flange portion.

5. Apparatus according to claim 4 wherein said primary magnet comprises an inner ring-like magnetic member and an outer ring-like magnetic member disposed in a spaced, concentric, cylindrical configuration with respect to each other thereby defining said annular region;
    and further wherein the outer circumference of said inner magnetic member and the inner circumference of said outer magnetic member comprise a plurality of equal-sized, evenly-spaced slots defining a plurality of north-south poles respectively around the circumferences of said magnetic members.

6. Apparatus according to claim 5 wherein said secondary magnet is positioned along the inner circumference of said outer magnetic member with its poles facing and adjacent to said annular region.

7. Apparatus according to claim 6 further wherein the outer circumference of said inner magnetic member comprises two longitudinal slots respectively adjacent the two poles of said secondary magnet.

8. Apparatus according to claim 7 wherein each of said longitudinal slots encompasses two adjacent equal-sized, evenly-spaced slots along the circumference of said inner magnetic member.

9. Apparatus according to claim 8 wherein each of said equal-sized, evenly-spaced slots is semicircular in configuration.

10. Apparatus according to claim 5 wherein said secondary magnet is positioned along the outer circumference of said inner magnetic member with its poles facing and adjacent to said annular region.

11. Apparatus according to claim 10 further wherein the inner circumference of said outer magnetic member comprises two longitudinal slots respectively adjacent the two poles of said secondary magnet.

12. Apparatus according to claim 11 wherein each of said longitudinal slots encompasses two adjacent equal-sized, evenly-spaced slots along the circumference of said outer magnetic member.

13. Apparatus according to claim 12 wherein each of said equal-sized, evenly-spaced slots is semicircular in configuration.

14. Apparatus according to claim 1 wherein said secondary magnet is an electromagnet.

15. Apparatus according to claim 1 wherein said secondary magnet is a permanent magnet.

16. Apparatus according to claim 1 further comprising a non-magnetic shield member surrounding of least a portion of said secondary magnet.

17. Apparatus according to claim 1 wherein said magnetic material comprises magnetically semi-hard material.

18. In a brake or clutch apparatus comprising a shaft, a radially-extending disk affixed to said shaft, said disk comprising a first portion comprising a magnetic material, a primary magnet assembly surrounding said shaft and comprising north and south poles on opposite sides of said first portion of said disk, and means for rotatably supporting said shaft for rotation on its axis relative to said primary magnet assembly so that said first portion of said disk rotates past said poles and through the magnetic field of said primary magnet when said shaft rotates;

the improvement which comprises a secondary magnet positioned about said shaft so that said first portion of said disk rotates past said secondary magnet and through the magnetic field of said secondary magnet when said shaft rotates.

19. Apparatus according to claim 18 wherein said magnetic material comprises magnetically semi-hard material.

20. A method for substantially eliminating cogging in a hysteresis brake and clutch apparatus of the sort which comprises a shaft, a radially-extending disk affixed to said shaft, said disk comprising a first portion comprising a magnetic material, a primary magnet assembly surrounding said shaft and comprising north and south poles on opposite sides of said first portion of said disk, and means for rotatably supporting said shaft for rotation on its axis relative to said primary magnet assembly so that said first portion of said disk rotates past said poles and through the magnetic field of said primary magnet when said shaft rotates, said method comprising:

positioning a secondary magnet about said shaft so that said first portion of said disk rotates past said secondary magnet and through the magnetic field of said secondary magnet when said shaft rotates; and turning said disk at lest one complete revolution.

* * * * *

UNITED STATES PATENT AND TRADEMARK OFFICE
CERTIFICATE OF CORRECTION

PATENT NO. : 5,238,095
DATED : 8/24/93
INVENTOR(S) : Jeffrey C. Pedu

It is certified that error appears in the above-indentified patent and that said Letters Patent is hereby corrected as shown below:

```
    Claim 16, column 12, line 64, after the word
"surrounding" and before the word "least", delete
the word "of" and replace it with the word -- at --.
```

Signed and Sealed this

Twenty-second Day of March, 1994

Attest:

BRUCE LEHMAN

*Attesting Officer*          Commissioner of Patents and Trademarks